United States Patent
Fjeldstad (10) Patent No.: US 11,120,542 B2
(45) Date of Patent: Sep. 14, 2021

(54) WETTABILITY ESTIMATION BY DIFFERENTIAL MULTI-PHASE SIMULATION

(71) Applicant: FEI Company, Hillsboro, OR (US)

(72) Inventor: Stale Havsgaard Fjeldstad, Trondheim (NO)

(73) Assignee: FEI Company, Hillsboro, OR (US)

( * ) Notice: Subject to any disclaimer, the term of this patent is extended or adjusted under 35 U.S.C. 154(b) by 532 days.

(21) Appl. No.: 15/974,640

(22) Filed: May 8, 2018

(65) Prior Publication Data

US 2019/0347375 A1 Nov. 14, 2019

(51) Int. Cl.
| | | |
|---|---|---|
| *G06T 7/00* | (2017.01) |
| *G06F 30/28* | (2020.01) |
| *G01N 13/02* | (2006.01) |
| *G06F 111/10* | (2020.01) |
| *E21B 47/002* | (2012.01) |

(52) U.S. Cl.
CPC ............ *G06T 7/001* (2013.01); *G01N 13/02* (2013.01); *G06F 30/28* (2020.01); *E21B 47/002* (2020.05); *G01N 2013/0208* (2013.01); *G06F 2111/10* (2020.01); *G06T 2207/10081* (2013.01)

(58) Field of Classification Search
CPC .......... G06T 7/001; G06T 2207/10081; G01N 13/02; G01N 2013/0208; E21B 47/002; G06F 30/28; G06F 2111/10; G06F 30/20
See application file for complete search history.

(56) References Cited

U.S. PATENT DOCUMENTS 8,725,477 B2 * 5/2014 Zhang ..................... E21B 47/00
703/10
8,854,430 B2 * 10/2014 Varslot .................. E21B 47/002
348/46

OTHER PUBLICATIONS

Arns, C.H., et al "Digital Core Laboratory: Petrophysical Analysis from 3D Imaging of Reservoir Core Fragments" Petrophysics, vol. 46, No. 4, pp. 260-277 (2005) (Year: 2005).*
Bultreys, T., et al "Imaging and image-based fluid transport modeling at the pore scale in geological materials: A practical introduction to the current state-of-the-art" Earth-Science Reviews, vol. 155, pp. 93-128 (2016) (Year: 2016).*
AlRatrout, A., et al "Automatic Measurement of Contact Angle in Pore-Space Images" Advances in Water Resources, vol. 109, pp. 158-169 (2017) (Year: 2017).*
Abdallah et al., "Fundamentals of Wettability," *Oilfield Review*, pp. 44-61 (2007).
"Contact angle," Wikipedia, available at: https://en.wikipedia.org/wiki/Contact_angle, 9 pages (Last edited: Mar. 19, 2018).

(Continued)

*Primary Examiner* — Jay Hann
(74) *Attorney, Agent, or Firm* — Klarquist Sparkman, LLP (57) ABSTRACT

Contact angles of multi-phase mixtures in a porous medium are determined by comparing images generated by flow simulations with a measured image of a fluid flow in the porous medium. A measured image can be compared image element by image element with corresponding locations in the flow simulations. A plurality of flow simulations associated with a corresponding plurality of contact angles is used for the comparison, and a contact angle associated with the greatest number of matches between the measured image and the flow simulation is selected.

20 Claims, 8 Drawing Sheets

(56) References Cited

OTHER PUBLICATIONS

Joekar-Niasar et al., "Analysis of Fundamentals of Two-Phase Flow in Porous Media Using Dynamic Pore-Network Models: A Review," *Critical Reviews in Environmental Science and Technology*, 42:1895-1976 (2012).

"Lattice Boltzmann Method—the kernel of Palabos," Palabos CFD, available at: http://www.palabos.org/software/lattice-boltzmann-method, 2 pages (2011-2012).

"Two-phase flow," Wikipedia, available at: https://en.wikipedia.org/wiki/Two-phase_flow, 3 pages (Last edited: Dec. 21, 2017).

"Wetting," Wikipedia, available at: https://en.wikipedia.org/wiki/Wetting, 11 pages (Last edited: Apr. 30, 2018).

Xiong et al., "Review of pore network modelling of porous media: Experimental characterisations, network constructions and applications to reactive transport," *Journal of Contaminant Hydrology*, 192:101-117 (2016).

Yu, "A Novel Lattice Boltzmann Method for Direct Numerical Simulation of Multiphase Flows," Dissertation, The Ohio State University, 44 pages (2009).

\* cited by examiner

FIG. 1A non-wetting

FIG. 1B low-wetting

FIG. 1C high wetting

FIG. 1D perfect wetting

WETTABILITY ESTIMATION BY DIFFERENTIAL MULTI-PHASE SIMULATION

FIELD

The disclosure pertains to quantifying wetting phase contact angles in a porous medium exposed to multiple fluids or gases.

BACKGROUND

Figure 1A:
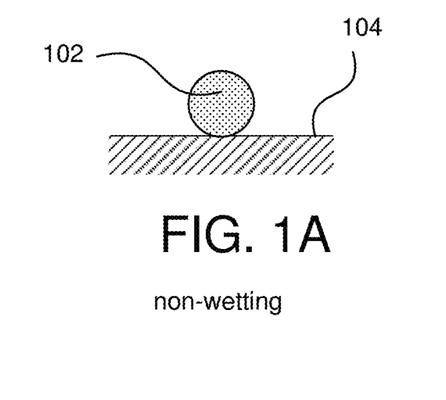
FIGS. 1A-1D illustrate different contact angles on a surface.
Figure 1B:
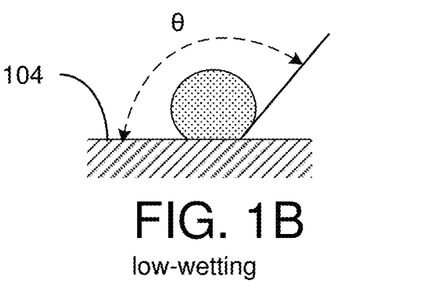
Figure 1C:
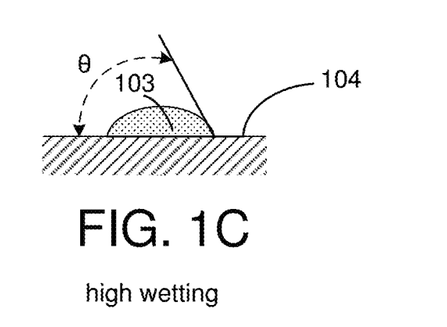
Figure 1D:
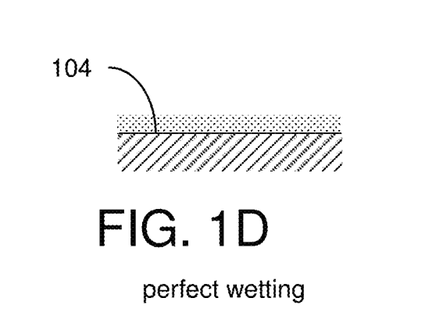
Figure 2:
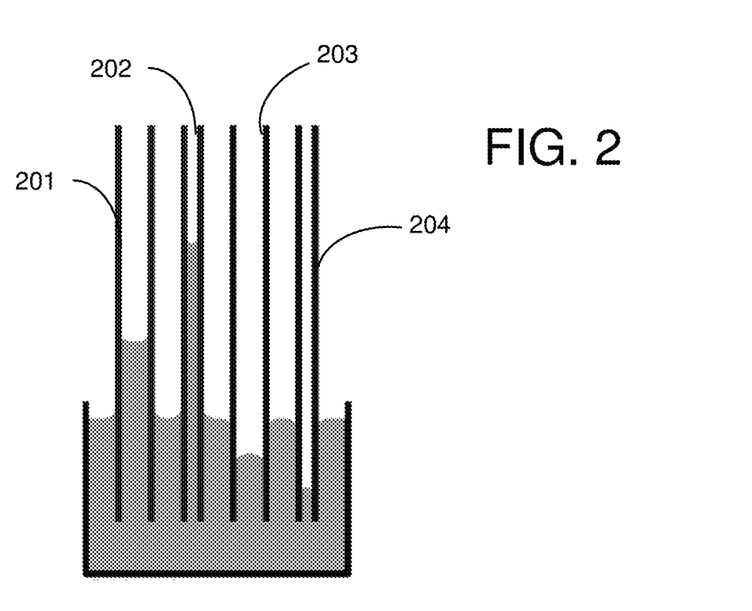
FIG. 2 illustrates contact angles in capillary tubes.

Many commercially significant processes require characterization of fluid and gas flow in porous media such as, for example, characterization of reservoir rock samples to evaluate the economic potential of an oil- or gas-reservoir. The flow in a solid porous media is defined by the pore-structure, the fluid-fluid interactions, and the fluid-solid interactions. The wettability describes the most dominant fluid-solid interaction in a porous media, and accurate characterization of the wettability is vital for understanding the flow of multiple phases in a porous media, such as a reservoir rock. Oil versus water wetting in oil/water mixtures is important in extraction of oil from reservoirs. Wettability describes relative attraction between a solid surface or a porous structure and a gas or liquid filling the structure. Wettabliity can be estimated based on an angle between the liquid and the solid surface or capillary walls of the porous medium. This angle is typically referred to as a contact angle. FIGS. 1A-1D illustrate contact angles θ at a surface 104 showing non-wetting (contact angle of 180°), low wetting (contact angle >90°), high wetting (contact angle <90°), and perfect wetting (contact angle of 0°), respectively. As a further illustration of contact angles, FIG. 2 similarly shows capillary tubes 201-204 with contact angles less than 90° (201, 202) and contact angles greater than 90° (203, 204). Contact angle is generally a function of salinity, acidity, oxidation, chemical composition, temperature, pressure, mineralogy, and chemical treatment.

Contact angles can be measured manually or automatically by direct assessment of contact angle, or using the sessile drop technique, measurements of electrical resistivity or capillary pressure, or other approaches. Unfortunately, conventional approaches are generally difficult to automate, particularly for in situ measurement, and are often subjective. In addition, these conventional methods cannot provide quantification of contact angle throughout a porous medium, but merely provide a global estimate. Improved approaches are needed for measurement of contact angle, and particularly for providing objective measurements in porous media.

SUMMARY

Disclosed herein are methods and apparatus that permit estimation, measurement, and assessment of wettability in porous media exposed to multi-phase mixtures. Examples refer to two phase mixtures (such as oil and water) for convenient explanation, but other fluids or gases can be similarly processed and evaluated.

In some examples, methods include obtaining an image of a medium in contact with a selected fluid and comparing a portion of the obtained image with a corresponding portion of one or more flow simulation images. Each of the flow simulation images is associated with a respective contact angle. Typically, a contact angle associated with one of the flow simulation images is selected based on the comparison. In some examples, one or more portions of the obtained image are compared with corresponding portions of the flow simulation images, and contact angles associated with each of the portions of the obtained image are selected. In any disclosed embodiment, at least the portion or portions of the obtained image is or are grey scale images, and the portions of the obtained image and the flow simulation images are compared based on image element grey levels.

In any disclosed embodiment, the fluid can comprise a first fluid and a second fluid, and image elements in the portions of the obtained image and the one or more flow simulation images that are associated with the first fluid are identified. The portion of the obtained image and the corresponding portions of the flow simulation images are compared based on determining a number of corresponding image elements that are both identified as the first fluid. In further examples, image elements in the portions of the obtained image and the one or more flow simulation images that are associated with the first fluid and the second fluid are identified. In some examples, the comparison is based on identifying corresponding image elements of the portion of the obtained image and image elements of the portion of the flow simulation images as associated with the first fluid or the second fluid. In this case, the comparison is based on determining a number of corresponding image elements that are both identified with the first fluid or with the second fluid. In some examples, each of the image elements of the portion of the obtained image and each of the image elements of the portion of the simulated images are determined as corresponding to the first fluid, the second fluid, or a porous matrix. In any of the above examples, the identification of each of the image elements of the portion of the obtained image with the first fluid, the second fluid, or the porous matrix is based on an image element gray level. A plurality of portions of the obtained image can be compared with corresponding portions of the flow simulation image to determine contact angles associated with each of the portions. In some cases, contact angle as a function of location throughout a sample can be obtained, and a map of contact angle produced.

In any of the above examples, a porous medium image is formed based on the obtained image, and the flow simulation image is associated with fluid flow in a porous medium corresponding to the porous medium image. The obtained image can be a computed tomography (CT) image, a visible image, an infrared image, a particle beam image, or other image. The obtained image can be a three dimensional image.

In typical examples, the respective contact angles include about 0 degrees, about 90 degrees, and about 180 degrees, and the fluid comprises a first fluid and a second fluid, wherein the first fluid is oil and the second fluid is water. In other examples, the contact angle is determined within a range.

In other examples, apparatus comprise an image analyzer configured to receive a measured image of a medium in contact with a selected fluid. A flow simulator is configured to produce a simulated image associated with flow of the selected fluid in the medium, wherein the simulated image is associated with a selected contact angle, and the image analyzer is configured to compare the measured image and the simulated image. In examples, the flow simulator is configured to produce simulated images associated with flow of the selected fluid in the medium, wherein the simulated images are associated with respective contact angles. The image analyzer is configured to compare the measured image and the simulated images, and select a contact angle based on the comparisons.

In typical examples, the medium is a porous medium and the flow simulator produces the simulated images based on a porous medium image obtained from the measured image. In any of the above examples, the image analyzer is configured to compare the measured image and the simulated images by comparing corresponding image elements and select the contact angle based on the simulated image associated with a largest number of matching image elements.

In any embodiment, the selected fluid can comprise a first fluid and a second fluid, wherein the image analyzer is configured to assign image element values to the measured image by associating each image element with the first fluid, the second fluid, or the porous medium. The comparison of the measured image and the simulated image can be based on the assigned image element values. In representative examples, the image analyzer is configured to assign image element values to the measured image by identifying image elements associated with the first fluid. The apparatus can comprise an imaging system situated to produce the measured image, such as a CT imaging system. In typical examples, a non-transitory computer readable medium is coupled to the image analyzer, and configured to store at least one of the measured image and one or more simulated images associated with respective contact angles.

In still further examples, apparatus comprise an imaging system situated to produce a measured image of a flow of a first fluid and a second fluid in a porous medium. An image analyzer is configured to receive the measured image, compare the measured image with a plurality of simulated images associated with respective contact angles, and select a contact angle associated with the simulated image having a greatest number of matched image elements corresponding to measured image image elements and simulated image image elements associated with the first fluid. A flow simulator is coupled to receive the measured image, determine a porous medium image, and produce the plurality of simulated images as flows of the first fluid and the second fluid based on the porous medium image.

The foregoing features and advantages of the disclosed technology will become more apparent from the following detailed description, which proceeds with reference to the accompanying figures.

DETAILED DESCRIPTION

As used herein, the term "image" refers to a viewable image presented on a display device such as liquid crystal or other display as well as corresponding numerical representations stored in non-transitory computer readable media such as in random access memory, magnetic and other types of disks, or other storage media or devices. Images can be stored in a variety of formats such as JPEG, TIFF, BMP, RAW, or other file formats. Images are associated with two or three dimensional arrays of image values as functions of location coordinates which are referred to herein as image elements for convenience. In some cases, image elements are associated with two dimensional images (or sections of a three dimensional image) and are referred to as picture elements or pixels. In general, a pixel is associated with one or more image values (such as intensity) at a location that can be specified with two coordinates. More generally, image elements of three dimensional images are referred to as volume elements or voxels, and are associated with one or more image values in a volume specified by suitable coordinates. Some formats for image storage provide compressed or compact representations, and can require processing to obtain image elements and associated image value. In some cases (such as for simulated images), images are not generally produced for viewing but are convenient for storing specimen characteristics as functions of one or more spatial coordinates. As noted above, images can be referred to as comprising image elements, voxels, or pixels, or combinations thereof that define coordinate locations and associated image values, magnitudes, visual characteristics, or other values. Images can be compared image element by image element (pixel by pixel or voxel by voxel) based on numeric values associated with gray value, color value(s), or other image characteristic. In some examples, one or more or all portions of a measured image are identified as being associated with a fluid or with a porous medium. Image elements can be indicated as being associated with a particular fluid or a medium using labels or other alphanumeric values as well. The porous medium geometry can be extracted using the identified portions for use in flow simulations. Most practical applications of the disclosed technology involve porous media, but the disclosed methods and apparatus can be used with other media as well.

As used herein, contact angles and ranges referred to as "about," refer to numerical values within ±5 degrees, ±15 degrees, or ±30 degrees.

The disclosed methods and apparatus pertain to contact angle and wettability estimation. Some examples are described with reference to oil recovery but the disclosed approaches have application to batteries, fuel cells, filters membranes, $CO_2$ storage, absorption improvement (e.g., for oil spills, diapers, or other applications), paints and other coatings, research on superhydophobic and superhydrophilic surfaces and materials, and other materials and applications.

As used in this application and in the claims, the singular forms "a," "an," and "the" include the plural forms unless the context clearly dictates otherwise. Additionally, the term "includes" means "comprises." Further, the term "coupled" does not necessarily exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections.

As discussed above, wettability describes the preference of a solid to be in contact with one liquid rather than another and can be quantified or describe with a contact angle. Typically, contact angles less than 90 degrees are referred as being associated with wetting surfaces, and contact angles greater than 90 degrees as being associated with non-wetting surfaces. Simulations of flows can be conveniently performed using a variety of available flow simulation techniques. Representative techniques include Lattice-Boltzmann (LB) models, smoothed particle hydrodynamics approaches, level-set models, percolation models, and pore-network models.

Figure 3:
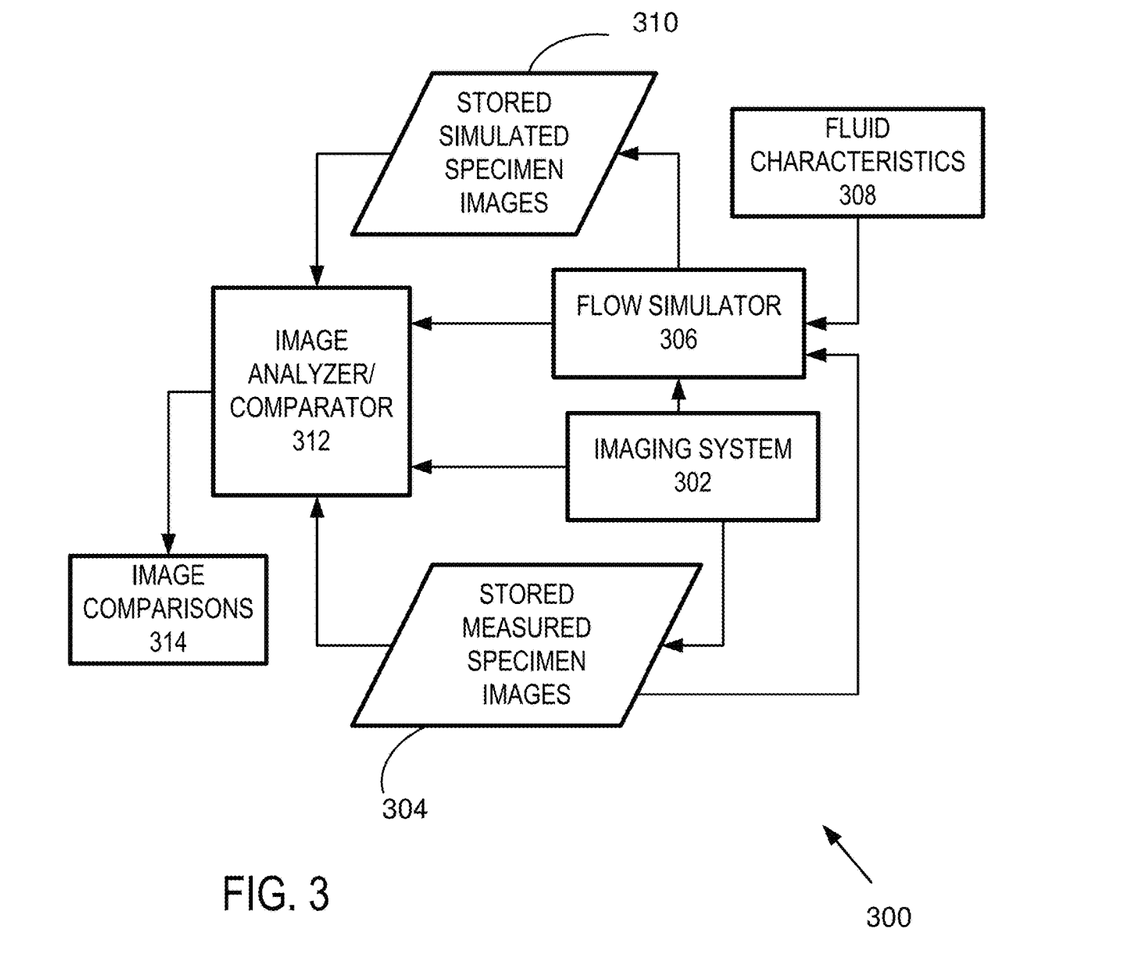
FIG. 3 illustrates a representative apparatus for estimating contact angles.

Referring to FIG. 3, a representative apparatus 300 for estimating contact angle includes an imaging system 302 such as an X-ray computed tomography (CT) system in which multiple X-ray measurements at different angles are processed to produce sectional images of "slices" of a specimen. With CT scanning, images of multiple slices internal to a specimen can be obtained in situ. CT image resolutions of between about 100 nm and 500 µm are generally available in commercial CT instruments. Other imaging system include focused ion beam (FIB) and scanning electron microscopy (SEM) imaging systems. While SEM provides a 2-dimensional images, a FIB can be used to obtain 3-dimensional images by alternating milling and imaging a specimen. FIB or SEM-based images can provide image resolutions of 1 nm or less. Other imaging systems can be used as appropriate for a particular specimen.

The imaging system 302 is coupled to a memory 304 that stores specimen images. In typical examples, one or more images of a portion of a porous medium in contact with one or more fluids are obtained and stored. In some examples, the selected fluids at least partially saturate the porous medium. Such images generally show complex arrangements of the selected fluids in specimen pores that are functions of one or more contact angles associated with one or more selected fluids. The imaging system 302 can produce one or more two dimensional or three dimensional images. For example, CT images can include one or more sets of two dimensional slice images that form three dimensional images.

The apparatus 300 also includes a flow simulator 306 that determines fluid flow of the selected fluids in the porous medium. However, in other examples, flow simulations are performed remotely, and resulting simulation data supplied to the apparatus 300. One or more specimen images are obtained directly from the imaging system 302 or retrieved from the memory 304, and based on fluid characteristics supplied from a non-transitory computer-readable medium 308 (such as a potential contact angle), a fluid distribution in the porous medium is obtained. Structure of the porous medium can be obtained from measured specimen images. A non-transitory computer readable medium 310 is configured to store simulated specimen images based on the flow simulations. Typically, a plurality of simulated images is obtained, with each image associated with different fluid characteristics. For example, for a two-phase system based on a wetting and a non-wetting fluid, simulations are performed for a plurality of contact angles. In many cases, simulated images associated with only a few contact angles are produced. For example, if estimation of a contact angle to within about 45 degrees is satisfactory, simulated images can be obtained with contact angles ranging from 0 degrees to 180 degrees in 45 degree increments. Other ranges and increments can be used as well, as may be preferred, such as 0, 10, . . . , 90 degrees.

The flow simulator 306 can produce simulated images associated with one or more two or three dimensional images with various fluid characteristics. For CT images, simulated images for each slice can be produced. Some or all slices can be used in estimating contact angle as discussed below.

An image analyzer 312 is coupled to the non-transitory computer-readable media 304, 310 to receive measured specimen images and simulated specimen images, respectively. Alternatively, measured specimen images and/or simulated specimen images can be provided directly to the image analyzer 312 from the imaging system 302 and the flow simulator 306, respectively. The image analyzer 312 generally executes an image element by image element (such as, a pixel by pixel or voxel by voxel) comparison of at least selected image portions (e.g., selected pixels, voxels, or image elements) to determine if each of the selected simulated image and measured image elements are occupied by the same fluid. In one example, a total number of image elements that match (i.e., image elements that are occupied by the same fluid) is determined based on one or more of the simulated images. A non-transitory computer-readable medium 314 is situated to receive and store measured/simulated image comparisons. In most cases, a contact angle is estimated as the contact angle associated with the simulated image having the largest number of image elements with the same fluid as the measured image.

In other examples, image elements can be deemed to match based on matches with a selected phase or phases of a multi-phase mixture, without consideration of matches associated with other phases. The image analyzer 312 can also perform multi-image comparisons based on one or more sets of two-dimensional images that correspond to three dimensional specimen images. Contact angle can be selected based on total image element matches for a three dimensional volume. In other cases, only selected portions of a specimen are of interest, and simulated image portions associated with these portions are used for comparison.

Figure 4:
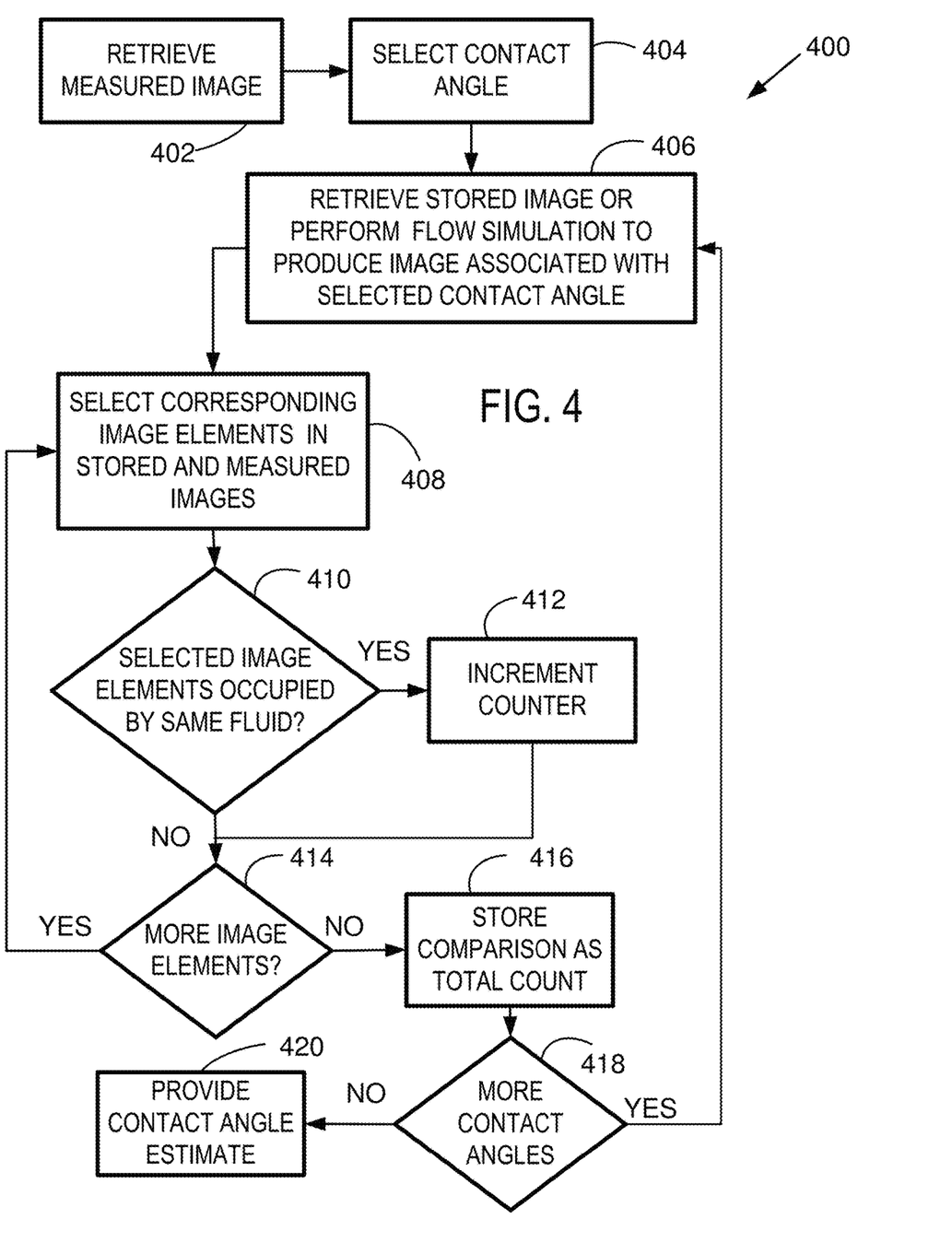
FIG. 4 illustrates a representative method of estimating contact angles.

Referring to FIG. 4, a representative method 400 of comparison includes, at 402, retrieving measured image values associated with an image or a portion thereof such those associated with one or more image elements, sets of image elements, or selected image regions. At 404, a contact angle is selected, and at 406 simulated image values are obtained from a stored simulated image or a portion thereof corresponding to the retrieved measured image values. Alternatively, a flow simulation can be performed. At 408, corresponding measured image values and simulated image values are selected. At 410, the measured and simulated image values are compared, typically to determine if measured and simulated image values correspond to the same fluid. If so, at 412 a counter is incremented. At 414, it is determined if additional image element contributions are to be compared, and if so, measured and simulated image values associated with additional image elements are selected at 408 for comparison at 410.

Upon completion of comparison of selected image elements based on measurements and simulation at the selected contact angle, a comparison value is stored as a count of image elements associated with fluid matches at 416. At 418, it is determined if additional contact angles are to be evaluated, and if so, at 406, a simulated image associated with a different contact angle is retrieved or produced by a suitable simulation. Comparison of additional simulated images (or portions) with measured images (or portions) continues as discussed above. Upon completion of the evaluation of one or more simulated images associated with respective contact angles, a suitable estimate of contact angle is provided at 420, typically the contact angle associated with a largest matching image element count. In some cases, the contact angle estimate is based on a weighted average of the contact angles used in the simulated images, with each weight based on the associated image element counts.

Figure 5:
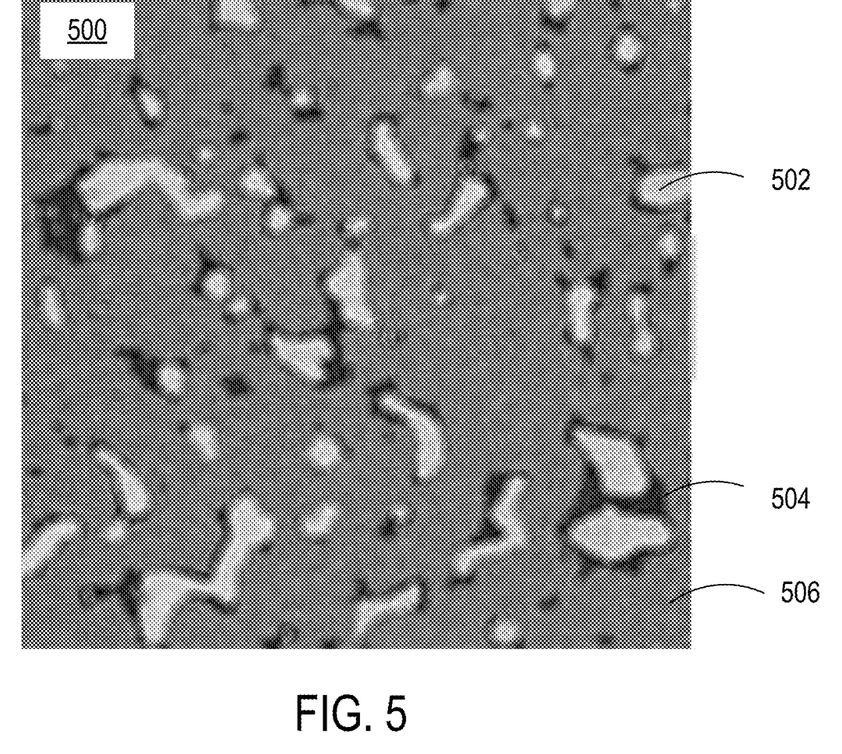
FIG. 5 illustrates a representative image for use in estimating contact angles.

A representative measured image 500 of an oil and water mixture is shown in FIG. 5. In this example, a mixture of a first phase 502 (lighter shade) and a second phase 504 (darker shade) is incorporated into a porous matrix 506 (intermediate shade). In order to compare with a simulated image, all first phase regions can be assigned a first common value and all second phase regions can be assigned a second common value that is different from the first common value. Such values can be numeric (such as integers 0 and 1) or logical values, or other values as may be convenient. A flow simulation based on the porous matrix 506 also assigns first and second values to first and second phase regions, respectively. Assignments typically are based on image values within selected ranges to accommodate variations in image values for the same phase. For example, some or all image elements in a measured image can be assigned gray values ranging from 0 to 1, wherein 0 corresponds to lightest image elements and 1 corresponds to darkest image elements. For example, image elements having gray values between 0 and 0.2 can be indicated as the first phase, while gray values between 0.7 and 1 can be indicated as the second phase, and the intermediate values as the porous matrix. Allocating gray values to particular ranges can be referred to as binning, and the associated measured images referred to as binned images. Typically, binning is not required for simulated images as each phase is specified by simulation.

Figure 6A:
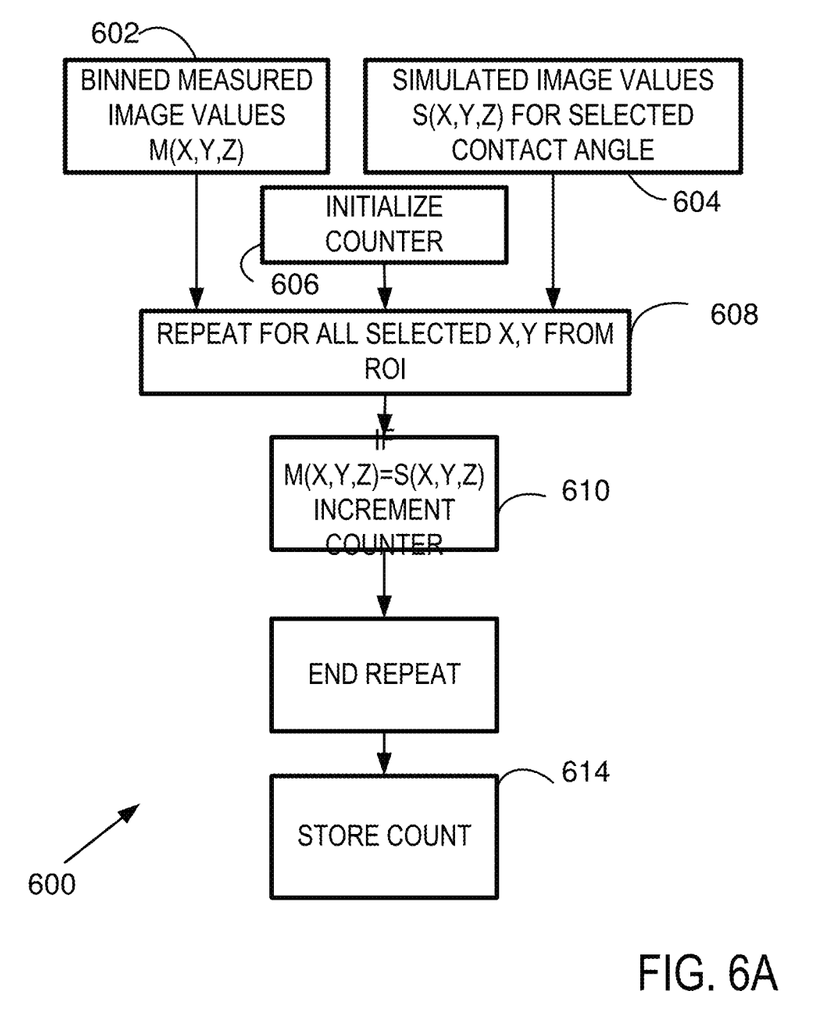
FIG. 6A illustrates a representative method of comparing measured and simulated images.

A representative method 600 based on binned measured images is shown in FIG. 6A. While in many cases, a complete specimen image is evaluated, selected portions can be evaluated, and in some cases, each associated with a different contact angle. At 602 and 604, binned measured image values $M(X,Y,Z)$ and corresponding simulated image values $S(X,Y,Z)$ are obtained, wherein X,Y,Z are spatial coordinates in a medium. At 606, a counter that is to accumulate a number of matched image elements is initialized, and at 608, $M(X,Y,Z)$ and $S(X,Y,Z)$ are processed to identify locations at which $M(X,Y,Z)=S(X,Y,Z)$ and the counter incremented at 610 by the number of matching image elements. Upon evaluation of all (X,Y,Z) locations in an image or a selected region of interest (ROI), a total count is stored at 614, typically along with an indication of the associated contact angle. The method of FIG. 6A can be repeated for one or more contact angles (each associated with a different simulated image), and a suitable contact angle selected as the contact angle that produces the largest count.

Figure 6B:
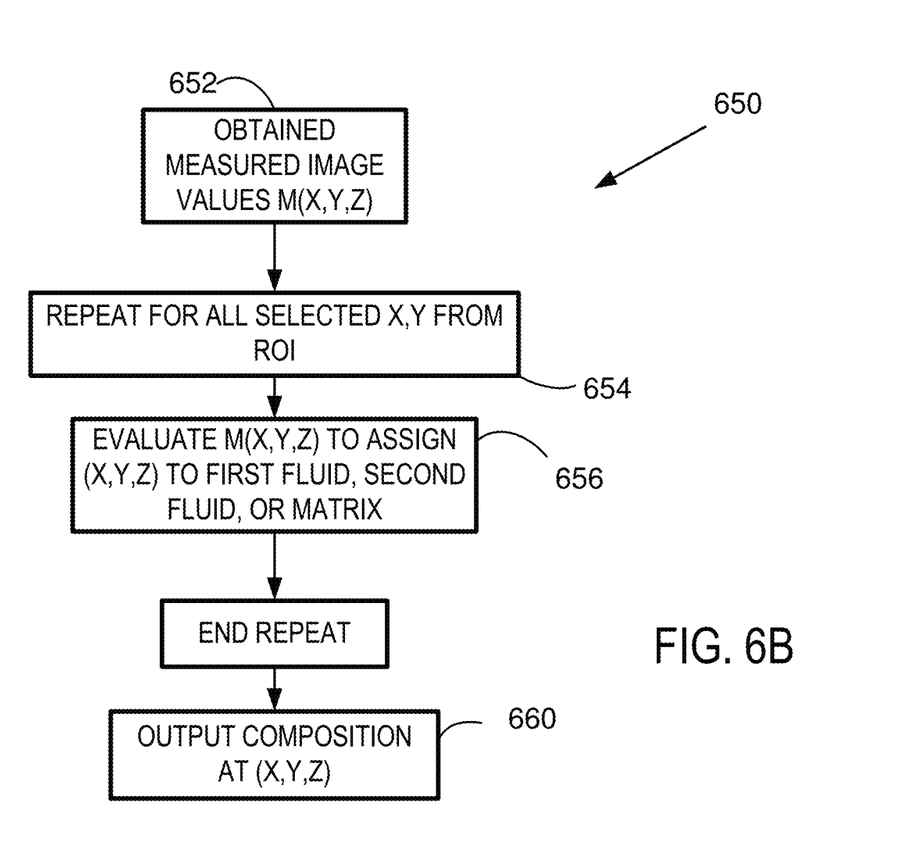
FIG. 6B illustrates a representative method determining a specimen material at locations in specimen images.

FIG. 6B illustrates a method 650 of processing a measured image to assign image elements to a first fluid, a second fluid, or a porous matrix. At 652, measured image values $M(X,Y,Z)$ are obtained. At 654, processing begins so that each image element is assigned based on the associated $M(X,Y,Z)$ until all image elements are assigned. A 660, composition as a function of position (X,Y,Z) can be output, and in some cases, $M(X,Y,Z)$ values as input area reassigned to composition values. For example, $M(X,Y,Z)$ can be assigned a numeric other value or label identifying whether the first fluid, the second fluid, or the matrix is situated as the corresponding location.

Figure 6C:
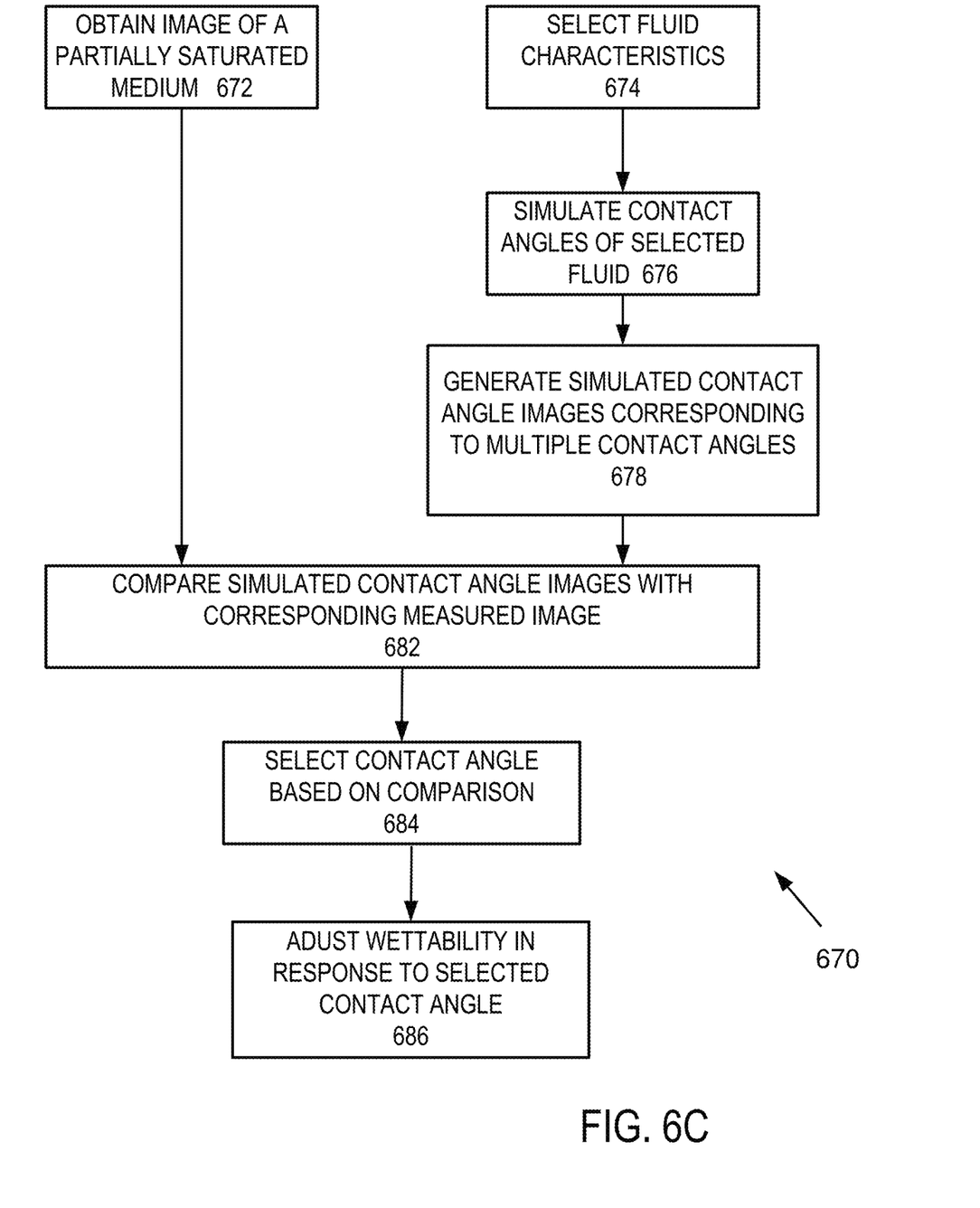
FIG. 6C illustrates estimation of contact angle based on multiple simulations.

FIG. 6C illustrates a method 670 in which an image of a partially saturated medium or other specimen is obtained at 672. At 674, fluid characteristics are selected and one or more contact angles are selected at 676. At 678, simulated images are produced for each of the one or more contact angles. At 682, the simulated images are compared with the obtained (measured) image and at 684, a contact angle is selected based on the comparison. In some applications, wettability is adjusted at 686 based on the selected contact angle by, for example, changing temperature, pressure, pH, salinity, or otherwise. For example, extraction of oil from reservoir can be more straightforward in porous media that are water wet.

In the examples of FIGS. 6A-6B, image element values associated with three-dimensional coordinates (X,Y,Z) are compared. Such values can be from a specimen volume or a section of a specimen or specimen image. In some examples, voxels of a selected specimen region of interest are used, while in other examples, pixels associated with a selected image portion are used.

Figure 7:
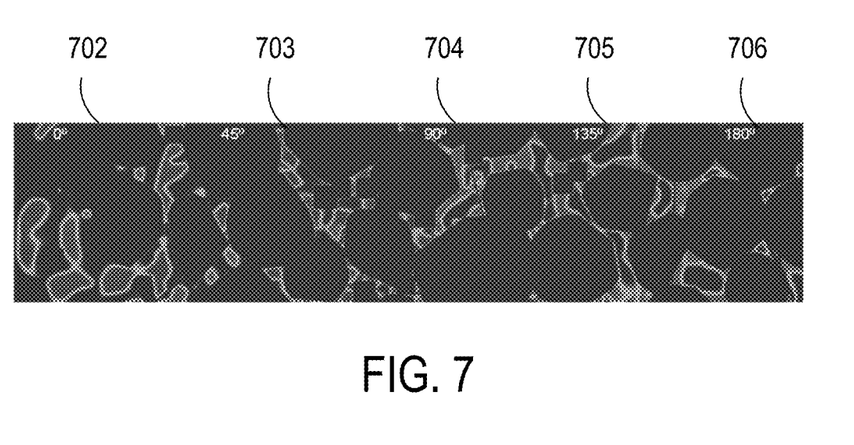
FIG. 7 illustrates a representative image for use in estimating contact angles for multiple portions of a medium.

FIG. 7 illustrates a simulated image having portions 702-705 associated with contact angles 0, 45, 90, 135, and 180 degrees, respectively. Fewer or more regions can be selected in an image, and different contact angle ranges can be selected. As shown in FIG. 7, the disclosed methods and apparatus permit local contact angle estimation so that different contact angles can be selected to characterize a single image. In some examples, a map of contact angle $\theta(X,Y)$ or $\theta(X,Y,Z)$ can be produced. While measured images can be used for comparison with simulated images using grey scale values, color values can be assigned for measured or simulated images and used for both comparison and visual display.

A contact angle may be used to establish wettability based on assignment of contact angles to ranges such as high wetting, intermediate wetting, and low wetting. For example, contact angles less than 90 degrees can be associated with high wetting and contact angles greater than 90 degrees can be associated with low wetting or non-wetting. If a specimen image is assigned a plurality of local contact angles, a weighted or other average contact angle can be obtained, such as an area weighted contact angle. Specimen wettability can be similarly evaluated based on a weighted contact angle or local contact angles.

Figure 8:
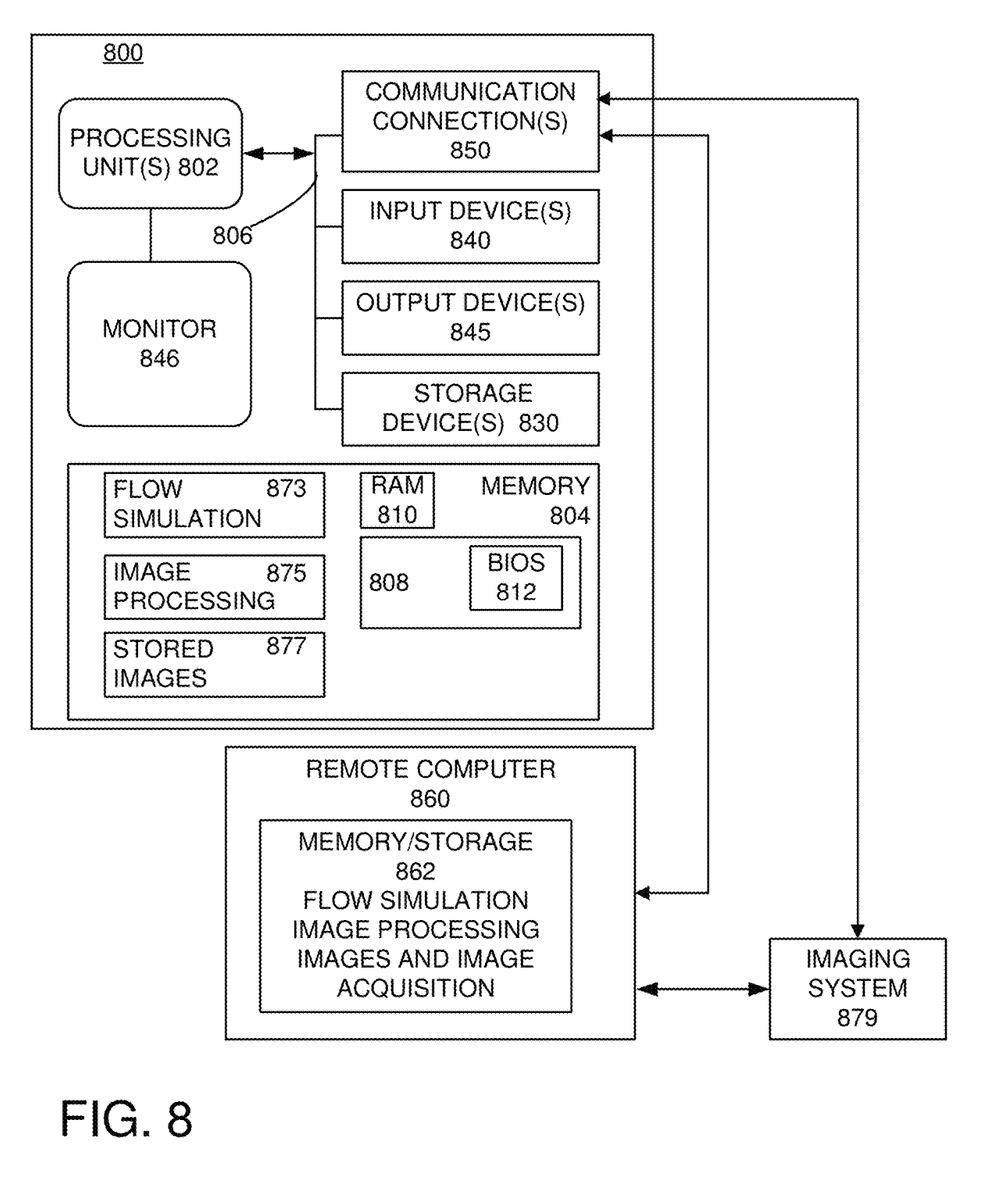
FIG. 8 illustrates a representative computing environment associated with any of the disclosed methods and apparatus.

FIG. 8 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, an exemplary system for implementing the disclosed technology includes a general purpose computing device in the form of an exemplary PC 800, including one or more processing units 802, a system memory 804, and a system bus 806 that couples various system components including the system memory 804 to the one or more processing units 802. The system bus 806 may be any of several types of bus structures including a memory bus or memory controller, a peripheral bus, and a local bus using any of a variety of bus architectures. The exemplary system memory 804 includes read only memory (ROM) 808 and random access memory (RAM) 810. A basic input/output system (BIOS) 812, containing the basic routines that help with the transfer of information between elements within the PC 800, is stored in ROM 808.

The exemplary PC 800 further includes one or more storage devices 830 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 806 by a hard disk drive interface, a magnetic disk drive interface, and an optical drive interface, respectively. The drives and their associated computer-readable media provide nonvolatile storage of computer-readable instructions, data structures, program modules, and other data for the PC 800. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 830 including an operating system, one or more application programs, other program modules, and program data. A user may enter commands and information into the PC 800 through one or more input devices 840 such as a keyboard and a pointing device such as a mouse. Other input devices may include a digital camera, microphone, joystick, game pad, satellite dish, scanner, or the like. These and other input devices are often connected to the one or more processing units 802 through a serial port interface that is coupled to the system bus 806, but may be connected by other interfaces such as a parallel port, game port, or universal serial bus (USB). A monitor 846 or other type of display device is also connected to the system bus 806 via an interface, such as a video adapter. Other peripheral output devices, such as speakers and printers (not shown), may be included.

The PC 800 may operate in a networked environment using logical connections to one or more remote computers, such as a remote computer 860. In some examples, one or more network or communication connections 850 are included. The remote computer 860 may be another PC, a server, a router, a network PC, or a peer device or other common network node, and typically includes many or all of the elements described above relative to the PC 800, although only a memory storage device 862 has been illustrated in FIG. 8. The personal computer 800 and/or the remote computer 860 can be connected to a logical a local area network (LAN) and a wide area network (WAN). Such networking environments are commonplace in offices, enterprise-wide computer networks, intranets, and the Internet.

When used in a LAN networking environment, the PC 800 is connected to the LAN through a network interface. When used in a WAN networking environment, the PC 800 typically includes a modem or other means for establishing communications over the WAN, such as the Internet. In a networked environment, program modules depicted relative to the personal computer 800, or portions thereof, may be stored in the remote memory storage device or other locations on the LAN or WAN. The network connections shown are exemplary, and other means of establishing a communications link between the computers may be used.

Computer-executable instructions for flow simulation and image processing can be stored in memory portions 873, 875, and simulated or measured images stored in memory portion 877. An imaging system 879 can be included in the PC 800, but is shown in FIG. 8 coupled to the communication connection 850 and the remote computer 860. The remote computer 860 can include memory portions for storage of computer-executable instructions for flow simulation, image processing, image acquisition, and measured and simulated images.

Systems such as those of FIG. 8 can be used as an image analyzer and can be coupled to receive one or more measured images of a medium in contact with a fluid and used to compare one or more measured and/or simulated images, typical based on pixel by pixel or voxel by voxel comparisons. For example, the processing unit 802 (which can be implemented as a dedicated or other processor chip) can receive images (measured or simulated) for comparison based on processor-executable instructions stored in one or more portions of the memory 804. Systems such as illustrated in FIG. 8 can also be used as image simulators which produce simulated images of a medium in contact with a fluid.

In view of the many possible embodiments to which the principles of the disclosed technology may be applied, it should be recognized that the illustrated embodiments are only preferred examples and should not be taken as limiting. I claim all that comes within the scope and spirit of the appended claims.

I claim:

1. A method, comprising:
   obtaining at least one image of a medium in contact with a fluid;
   comparing at least a portion of the obtained image with a corresponding portion of a flow simulation image associated with a contact angle; and
   determining a contact angle of the fluid based on the comparison, wherein the medium is a porous medium, and the flow simulation image is based on the image of the medium in contact with the fluid.

2. A method, comprising:
obtaining at least one image of a medium in contact with a fluid;
comparing at least a portion of the obtained image with a corresponding portion of a flow simulation image associated with a contact angle; and
determining a contact angle of the fluid based on the comparison, wherein the at least one fluid comprises a first fluid and a second fluid, and further comprising identifying image elements of the portion of the obtained image and image elements of the portion of the flow simulation image as associated with the first fluid or the second fluid, wherein the comparing the portion of the obtained image with the corresponding portion of flow simulation image is based on determining a number of corresponding image elements that are either both identified with the first fluid or with the second fluid.

3. The method of claim 2, wherein the comparing the portion of the obtained image with the corresponding portion of the flow simulation image is based on determining a number of corresponding image elements that are both identified as associated with the first fluid.

4. The method of claim 2, further comprising identifying each of the image elements of the portion of the obtained image and each of the image elements of the portion of the flow simulation image with the first fluid, the second fluid, or a porous matrix.

5. The method of claim 4, wherein the obtained image is a computed tomography (CT) image.

6. The method of claim 5, wherein the CT image is a three dimensional image.

7. The method of claim 4, wherein the identification of each of the image elements of the portion of the obtained image with the first fluid, the second fluid, or the porous matrix is based on an image element gray level.

8. The method of claim 2, further comprising comparing a plurality of portions of the obtained image with corresponding portions of at least one flow simulation image to determine contact angles associated with each of the portions.

9. The method of claim 8, wherein the contact angles include about 0 degrees, about 90 degrees, and about 180 degrees.

10. The method of claim 8, wherein the contact angles are determined within a range.

11. The method of claim 2, further comprising forming a porous medium image based on the obtained image, wherein the flow simulation image is associated with fluid flow in a porous medium corresponding to the porous medium image.

12. The method of claim 2, wherein the first fluid is oil and the second fluid is water.

13. An apparatus, comprising:
an image analyzer configured to receive a measured image of a medium in contact with a selected fluid; and
a computer system with computer-executable instructions for flow simulation configured to produce simulated images associated with flow of the selected fluid in the medium, wherein the simulated images are associated with respective selected contact angles, wherein the image analyzer is configured to compare the measured image and the simulated images and select a contact angle based on the comparisons, wherein the medium is a porous medium, and the flow simulator produces the simulated images based on a porous medium image obtained from the measured image.

14. The apparatus of claim 13, wherein the image analyzer is configured to compare the measured image and the simulated images by comparing corresponding image elements and select the contact angle based on the simulated image associated with a largest number of matching image elements.

15. The apparatus of claim 14, wherein the selected fluid comprises a first fluid and a second fluid, wherein the image analyzer is configured to assign image element values to the measured image by associating each image element with the first fluid, the second fluid, or the porous medium, and the comparison of the measured image and the simulated image based on the assigned image element values.

16. The apparatus of claim 14, wherein the selected fluid comprises a first fluid and a second fluid, wherein the image analyzer is configured to assign image element values to the measured image by identifying image elements associated with the first fluid.

17. The apparatus of claim 13, further comprising an imaging system situated to produce the measured image.

18. The apparatus of claim 17, wherein the imaging system is a CT imaging system.

19. The apparatus of claim 18, further comprising a non-transitory computer readable medium coupled to the image analyzer and configured to store at least one of the measured image and one or more simulated images associated with respective contact angles.

20. An apparatus, comprising:
an imaging system situated to produce a measured image of a flow of a first fluid and a second fluid in a porous medium;
an image analyzer configured to receive the measured image, compare the measured image with a plurality of simulated images associated with respective contact angles, and select a contact angle associated with the simulated image having a greatest number of matched image elements corresponding to measured image elements and simulated image elements associated with the first fluid; and
a computer system configured with computer-executable instructions for flow simulation and situated to receive the measured image, determine a porous medium image, and produce the plurality of simulated images as flows of the first fluid and the second fluid based on the porous medium image.

* * * * *